Patented Oct. 29, 1940

2,219,350

UNITED STATES PATENT OFFICE 2,219,350

THERAPEUTIC PRODUCT AND PROCESS OF PREPARING IT

George B. Walden, Indianapolis, Ind., assignor to Eli Lilly and Company, Indianapolis, Ind., a corporation of Indiana No Drawing. Application February 24, 1937, Serial No. 127,527

8 Claims. (Cl. 167—75)

It is the object of my invention to obtain a more effective utilization of "Insulin"; and, more specifically, to make an "Insulin" product which is effective over a longer period of time than is ordinary "Insulin."

I have found that "Insulin" will somehow combine with the reaction product of guanidine and certain of its derivatives with formaldehyde and its polymers, to form a product, possibly a chemical or physical compound of some nature, which when administered subcutaneously or intramuscularly produces a reduction in the blood-sugar level over a longer period of time than does the similar administration of the "Insulin" alone.

The "guanidine derivatives" which I may use include not only guanidine salts, by which I mean addition products formed by the reaction of guanidine with an acid, such for instance as guanidine sulfate, guanidine hydrochloride, guanidine nitrate, and guanidine carbonate, but also various other substances containing the guanidine nucleus

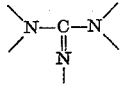

(1)

and capable of forming with formaldehyde and its polymers a reaction product which modifies the "Insulin" to prolong the physiological action thereof. Usually in that reaction product the several bonds of the guanidine nucleus are satisfied with substituents, either hydrogen or a radical, which confer on the reaction product the characteristic ability to form a precipitate with "Insulin"—generally at about pH 7.0, by which I mean between pH 6.5 and pH 7.5.

The term "formaldehyde and its polymers" includes such products as paraformaldehyde and other polyoxymethylenes which may be formed by polymerization from formaldehyde. The reaction product of guanidine and the aforesaid derivatives thereof with formaldehyde and its polymers may be obtained, desirably under slightly alkaline conditions, by simply letting the two reactants stand for a period of several hours in contact with each other, or by heating the two reactants together. For instance:

*Example I.*—To 10 gm. of guanidine carbonate I may add about 20 cc. of 40% formaldehyde, or about 8 gm. of paraformaldehyde in about 12 cc. of water, and either let the whole stand for a while, as over night, or else boil the mixture until the reaction is complete, which usually requires several minutes. The reaction which occurs, in this and the other examples given, results in the formation of a product the exact nature of which I am not now prepared to state, but which for convenience I shall generically refer to herein simply as the reaction product.

The reaction product of guanidine carbonate and formaldehyde, when in solid form, is white in color, soluble in water, and substantially insoluble in alcohol and ether.

*Example II.*—To 10 gm. of guanidine sulfate (or of guanidine hydrochloride or guanidine nitrate or guanidine) I may add about 20 cc. of 40% formaldehyde, and also about 10 cc. of ammonium hydroxide, and boil the mixture until the formaldehyde-guanidine reaction is complete.

*Example III.*—To 10 gm. of decamethylene-diguanidine dihydrochloride (known as "Synthalin"), (2) 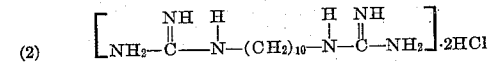

I may add about 20 cc. of 40% formaldehyde, and about 10 cc. of ammonium hydroxide; and boil the mixture until the reaction is complete. The reaction product, like those of Examples I and II, is broadly speaking a guanidine-formaldehyde product; and I mean to include such products when I use the term "reaction product."

*Example IV.*—I follow the procedure of Example III, save that as the guanidine derivative I use 4,4'-diguanidodiphenyl dihydrochloride, (3) 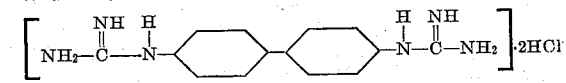

In order to carry out the reaction, it is desirable that slightly alkaline conditions be maintained. When guanidine carbonate is used, the inherent alkalinity of the carbonate is usually sufficient. When guanidine salts which are not inherently alkaline are used, however, I may produce the desired slight alkalinity in any suitable way, as by adding ammonium hydroxide to the mixture.

In all of these examples, just as in Example I, I may use paraformaldehyde or other polyoxymethylene instead of formaldehyde.

Other variations of producing the reaction product may be made, but the examples given are believed to be sufficient to indicate their general character.

The proportions given in the examples are merely illustrative, and not limiting. At present I prefer that there be an excess of the formaldehyde or its polymers, but I do not consider that essential.

The process of forming such a reaction product, and the reaction product itself, form the subject-matter of my co-pending application Serial No. 127,528, filed February 24, 1937.

By evaporating the solution to dryness at room temperature, a solid may be obtained containing the reaction product. The solid reaction product, obtained in any desired way from the solution, may be used with the "Insulin" to produce the desired final product.

Instead of separating the reaction product from the solution in which it was formed, I may use that solution with the reaction product in it as the substance to be mixed with the "Insulin."

However the reaction product is used, whether in solid form or in the original solution, the reaction product, and "Insulin" of any character, are suitably mixed in any desired way. The proportions may vary widely, depending on the final results desired. When it is desired that the "Insulin" effect be greatly prolonged, I prefer that there be at least enough, and desirably rather more than enough, of the reaction product to cause a maximum amount of precipitate when by adjusting the hydrogen ion concentration a precipitation is caused—such as usually occurs between pH 6.0 and pH 8.0. For instance, assuming that there are about 20 units per mg. of solid "Insulin," which is within the usual range of ordinary commercial "Insulin," in such cases I desirably add at least 1 mg. of the reaction product for each 10 mg. of "Insulin."

I may vary the product thus formed between "Insulin" and the reaction product by the addition of another ingredient if desired—a metal of the class consisting of zinc, nickel, cobalt, cadmium, calcium, iron, copper, and aluminum, preferably in the form of a salt. That is, the product may be used with or without the addition of such metal; but I have found it desirable from several standpoints to have a metal present, especially zinc. Good results are obtainable with as little as 0.025 mg. of zinc per 100 units of "Insulin;" and I desirably add at least that much. Larger amounts of metal may be used, and indeed somewhat larger amounts seem to be desirable; with no upper limit except increased toxicity and untoward local reactions, which should be avoided, to which end I desirably keep the metal present below about 1.0 mg. per 100 units of "Insulin."

I am not the first to put together a metal and "Insulin" to produce a prolongation of "Insulin" effect, as that has been done by David A. Scott and Albert M. Fisher. But, so far as I know, I am the first to use a metal with "Insulin" modified by the addition of the aforesaid reaction product, as well as the first to modify "Insulin" by the addition of such reaction product.

The final product obtained, whether or not a metal is used, may be administered in water either subcutaneously or intramuscularly, and produces a lowering of the blood-sugar level of longer duration than does ordinary "Insulin." The hydrogen ion concentration may be adjusted as desired, and the product may be used with safety and effectiveness whether it is a solution or a suspension. For instance: It may be adjusted to about pH 3.0 to pH 4.0, in which range the product is usually in solution, and so administered; with excellent results in prolonging the "Insulin" effect. Or, it may be adjusted to about pH 6.0 to pH 8.0, in which range the product is usually mainly in suspension, and so administered; generally with rather greater prolongation of "Insulin" effect than on administration of the same product in solution.

I claim as my invention:

1. The process of producing an "Insulin" preparation which has a prolonged physiological effect, which consists in putting together "Insulin" and the reaction product of a substance of the class consisting of formaldehyde and its polymers with a guanidine salt.

2. The process of producing an "Insulin" preparation which has a prolonged physiological effect, which consists in putting together "Insulin" and the reaction product of a substance of the class consisting of formaldehyde and its polymers with guanidine carbonate.

3. The process of producing an "Insulin" preparation which has a prolonged physiological effect, which consists in putting together "Insulin" and the reaction product of a substance of the class consisting of formaldehyde and its polymers with guanidine.

4. A composition of matter, consisting of the resultant product obtained by mixing "Insulin" and the reaction product of a substance of the class consisting of formaldehyde and its polymers with a guanidine salt.

5. A composition of matter, consisting of the resultant product obtained by mixing "Insulin" and the reaction product of a substance of the class consisting of formaldehyde and its polymers with guanidine carbonate.

6. A composition of matter, consisting of the resultant product obtained by mixing "Insulin" and the reaction product of a substance of the class consisting of formaldehyde and its polymers with guanidine.

7. The process of producing an "Insulin" preparation which has a prolonged physiological effect, which consists in putting together "Insulin" and the reaction product of a substance of the class consisting of formaldehyde and its polymers with a substance of the class consisting of guanidine, its salts, and the guanidine derivatives decamethylenediguanidine dihydrochloride and 4,4'-diguanidodiphenyl dihydrochloride.

8. A composition of matter, consisting of the resultant product obtained by mixing "Insulin" and the reaction product of a substance of the class consisting of formaldehyde and its polymers with a substance of the class consisting of guanidine, its salts, and the guanidine derivatives decamethylenediguanidine dihydrochloride and 4,4'-diguanidodiphenyl dihydrochloride.

GEORGE B. WALDEN.